US012753727B2

(12) United States Patent
Takemura et al.

(10) Patent No.: US 12,753,727 B2
(45) Date of Patent: Oct. 6, 2026

(54) FUEL TANK PROCESSING APPARATUS

(71) Applicant: SUBARU CORPORATION, Tokyo (JP)

(72) Inventors: Akihiro Takemura, Tokyo (JP); Tetsuya Kaneko, Tokyo (JP); Toshimitsu Waki, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days.

(21) Appl. No.: 19/041,733

(22) Filed: Jan. 30, 2025

(65) Prior Publication Data

US 2025/0297582 A1 Sep. 25, 2025

(30) Foreign Application Priority Data

Mar. 25, 2024 (JP) ................................. 2024-048603

(51) Int. Cl.

*F02M 33/02* (2006.01)
*F02D 41/00* (2006.01)
*F02M 25/08* (2006.01)

(52) U.S. Cl.

CPC ....... *F02D 41/003* (2013.01); *F02M 25/0836* (2013.01)

(58) Field of Classification Search

CPC ........ F02M 25/0836; F02M 2025/0845; F02D 41/004; F02D 41/0042; B60K 15/03519; B60K 2015/03514
USPC .......................................................... 123/518
See application file for complete search history.

(56) References Cited

U.S. PATENT DOCUMENTS

| | | | | |
|---|---|---|---|---|
| 10,267,267 | B2 * | 4/2019 | Kimoto | B60K 15/03519 |
| 10,934,976 | B2 * | 3/2021 | Murai | F02M 25/0836 |
| 2005/0217645 | A1 * | 10/2005 | Fukaya | F02M 25/0854 123/519 |
| 2011/0253110 | A1 * | 10/2011 | Fukui | F02D 41/004 123/520 |
| 2014/0102420 | A1 | 4/2014 | Kimoto et al. | |
| 2015/0144111 | A1 * | 5/2015 | Akita | F02M 25/0836 123/519 |
| 2018/0264937 | A1 * | 9/2018 | Fukui | B60K 15/03504 |
| 2022/0205417 | A1 * | 6/2022 | Buseki | F02M 37/0017 |

FOREIGN PATENT DOCUMENTS

JP 2014-77422 A 5/2014

* cited by examiner

*Primary Examiner* — Hung Q Nguyen
*Assistant Examiner* — James J Kim
(74) *Attorney, Agent, or Firm* — McGinn IP Law Group, PLLC

(57) ABSTRACT

A fuel tank processing apparatus includes a first valve, a discharge path, a second valve, and a calculation controller. The first valve is disposed in a fuel tank that stores fuel. The first valve communicates with outside of the fuel tank through the discharge path. Gas discharged from the fuel tank flows through the discharge path. The second valve is disposed in the discharge path. The calculation controller is configured to adjust an opening degree of the second valve. The calculation controller is configured to adjust the opening degree of the second valve based on a change in condition of the fuel tank when the second valve is opened.

19 Claims, 6 Drawing Sheets

FIG. 5

AMOUNT OF FUEL LEFT

70L

69L

...

3L

2L

1L

DRAIN PRESSURE | TIME SPENT FOR DEPRESSURIZATION [sec]

| | DRAIN PRESSURE DROP [kPa] | TIME SPENT FOR DEPRESSURIZATION [sec] | | | | | | | | | | |
|---|---|---|---|---|---|---|---|---|---|---|---|---|
| | | 0 | 1 | 2 | 3 | 4 | 5 | 6 | 7 | 8 | 9 | 10 |
| TANK INTERNAL PRESSURE [kPa] | 2 → 0 | 0.0 | 0.0 | 0.0 | 0.0 | 0.0 | 0.0 | 0.0 | 0.0 | 0.0 | 0.0 | 0.0 |
| | 4 → 2 | 0.0 | 2.4 | 2.5 | 2.6 | 2.7 | 2.8 | 2.9 | 3.0 | 3.1 | 3.2 | 3.3 |
| | 6 → 4 | 0.0 | 2.3 | 2.4 | 2.5 | 2.6 | 2.7 | 2.8 | 2.9 | 3.0 | 3.1 | 3.2 |
| | 8 → 6 | 0.0 | 2.2 | 2.3 | 2.4 | 2.5 | 2.6 | 2.7 | 2.8 | 2.9 | 3.0 | 3.1 |
| | 10 → 8 | 0.0 | 2.1 | 2.2 | 2.3 | 2.4 | 2.5 | 2.6 | 2.7 | 2.8 | 2.9 | 3.0 |
| | 12 → 10 | 0.0 | 2.0 | 2.1 | 2.2 | 2.3 | 2.4 | 2.5 | 2.6 | 2.7 | 2.8 | 2.9 |
| | 14 → 12 | 0.0 | 1.9 | 2.0 | 2.1 | 2.2 | 2.3 | 2.4 | 2.5 | 2.6 | 2.7 | 2.8 |
| | 16 → 14 | 0.0 | 1.8 | 1.9 | 2.0 | 2.1 | 2.2 | 2.3 | 2.4 | 2.5 | 2.6 | 2.7 |
| | 18 → 16 | 0.0 | 1.7 | 1.8 | 1.9 | 2.0 | 2.1 | 2.2 | 2.3 | 2.4 | 2.5 | 2.6 |
| | 20 → 18 | 0.0 | 1.6 | 1.7 | 1.8 | 1.9 | 2.0 | 2.1 | 2.2 | 2.3 | 2.4 | 2.5 |
| | 22 → 20 | 0.0 | 1.5 | 1.6 | 1.7 | 1.8 | 1.9 | 2.0 | 2.1 | 2.2 | 2.3 | 2.4 |
| | 24 → 22 | 0.0 | 1.4 | 1.5 | 1.6 | 1.7 | 1.8 | 1.9 | 2.0 | 2.1 | 2.2 | 2.3 |
| | 26 → 24 | 0.0 | 1.3 | 1.4 | 1.5 | 1.6 | 1.7 | 1.8 | 1.9 | 2.0 | 2.1 | 2.2 |
| | 26 → 24 | 0.0 | 1.2 | 1.3 | 1.4 | 1.5 | 1.6 | 1.7 | 1.8 | 1.9 | 2.0 | 2.1 |
| | 28 → 26 | 0.0 | 1.1 | 1.2 | 1.3 | 1.4 | 1.5 | 1.6 | 1.7 | 1.8 | 1.9 | 2.0 |
| | 30 → 28 | 0.0 | 1.0 | 1.1 | 1.2 | 1.3 | 1.4 | 1.5 | 1.6 | 1.7 | 1.8 | 1.9 |

FIG. 6

70L | 69L | … | 3L | 2L | 1L

| TANK INTERNAL PRESSURE [kPa] | SEALING VALVE OPENING DEGREE [%] | DRAIN PRESSURE DROP [kPa] | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| | | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 | 2.1 | 2.2 | 2.3 | 2.4 | 2.5 | 2.6 | 2.7 | 2.8 | 2.9 | 3.0 |
| | 2 → 0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| | 4 → 2 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 6 → 4 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 8 → 6 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 10 → 8 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 12 → 10 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 14 → 12 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 16 → 14 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 18 → 16 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 20 → 18 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 22 → 20 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 24 → 22 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 26 → 24 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 26 → 24 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 28 → 26 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |
| | 30 → 28 | 0.0 | 13.0 | 12.0 | 11.0 | 10.0 | 9.0 | 8.0 | 7.0 | 6.0 | 5.0 | 4.0 | 3.0 | 2.0 | 1.0 | 0.0 | -1.0 | -2.0 | -3.0 | -4.0 | -5.0 | -6.0 | -7.0 | -8.0 | -9.0 | -10.0 | -11.0 | -12.0 | -13.0 | -14.0 | -15.0 |

FUEL TANK PROCESSING APPARATUS

CROSS-REFERENCE TO RELATED APPLICATIONS

The present application claims priority from Japanese Patent Application No. 2024-048603 filed on Mar. 25, 2024, the entire contents of which are hereby incorporated by reference.

BACKGROUND

The disclosure relates to a fuel tank processing apparatus that reduces an internal pressure of a fuel tank when the fuel tank is refilled.

In a vehicle including an engine as a drive source, fuel supplied to the engine is stored in a fuel tank. Generally, the fuel tank is in a high-pressure state due to vaporized gas, which is fuel in a vaporized state. Therefore, when the fuel tank is to be refilled, the gas is discharged from the fuel tank to the outside to depressurize the fuel tank. Thus, the fuel and vaporized gas are prevented from being ejected to the outside through a fuel filler port of the fuel tank when the fuel filler port is opened. Japanese Unexamined Patent Application Publication No. 2014-77422 describes an example of a disclosure regarding the depressurization of a fuel tank when the fuel tank is refilled.

SUMMARY

An aspect of the disclosure provides a fuel tank processing apparatus including a first valve, a discharge path, a second valve, and a calculation controller. The first valve is disposed in a fuel tank that stores fuel. The first valve communicates with outside of the fuel tank through the discharge path. Gas discharged from the fuel tank flows through the discharge path. The second valve is disposed in the discharge path. The calculation controller is configured to adjust an opening degree of the second valve. The calculation controller is configured to adjust the opening degree of the second valve based on a change in condition of the fuel tank when the second valve is opened.

An aspect of the disclosure provides a fuel tank processing apparatus including a first valve, a discharge path, a second valve, and circuitry. The first valve is disposed in a fuel tank that stores fuel. The first valve communicates with outside of the fuel tank through the discharge path. Gas discharged from the fuel tank flows through the discharge path. The second valve is disposed in the discharge path. The circuitry is configured to adjust an opening degree of the second valve. The circuitry is configured to adjust the opening degree of the second valve based on a change in condition of the fuel tank when the second valve is opened.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 5 illustrates correspondence tables used to estimate a pressure drop when the fuel tank is depressurized by using the fuel tank processing apparatus according to the embodiment of the disclosure; and FIG. 6 illustrates correspondence tables used to estimate an opening degree of a solenoid valve when the fuel tank is depressurized by using the fuel tank processing apparatus according to the embodiment of the disclosure.

DETAILED DESCRIPTION

The above-described disclosure has room for improvement in effectively depressurizing the fuel tank when the fuel tank is refilled.

For example, due to the structure of a release path through which the vaporized gas flows for depressurization, the depressurization of the fuel tank involves a certain stand-by time when the fuel tank is refilled.

When the flow rate of the vaporized gas is increased to reduce the stand-by time, a vent valve disposed in the release path may be locked due to a pressure difference. This impedes the operation of releasing the vaporized gas.

In addition, even when a variable valve with a stepwise-adjustable opening degree is disposed at an intermediate location of the release path, it is difficult to precisely control the opening degree of the variable valve. Therefore, it has not been easy to quickly depressurize the fuel tank while preventing the vent valve from being locked.

It is desirable to provide a fuel tank processing apparatus capable of quickly depressurizing the fuel tank while preventing the valve from being locked.

A fuel tank processing apparatus 11 according to an embodiment of the disclosure will now be described in detail with reference to the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
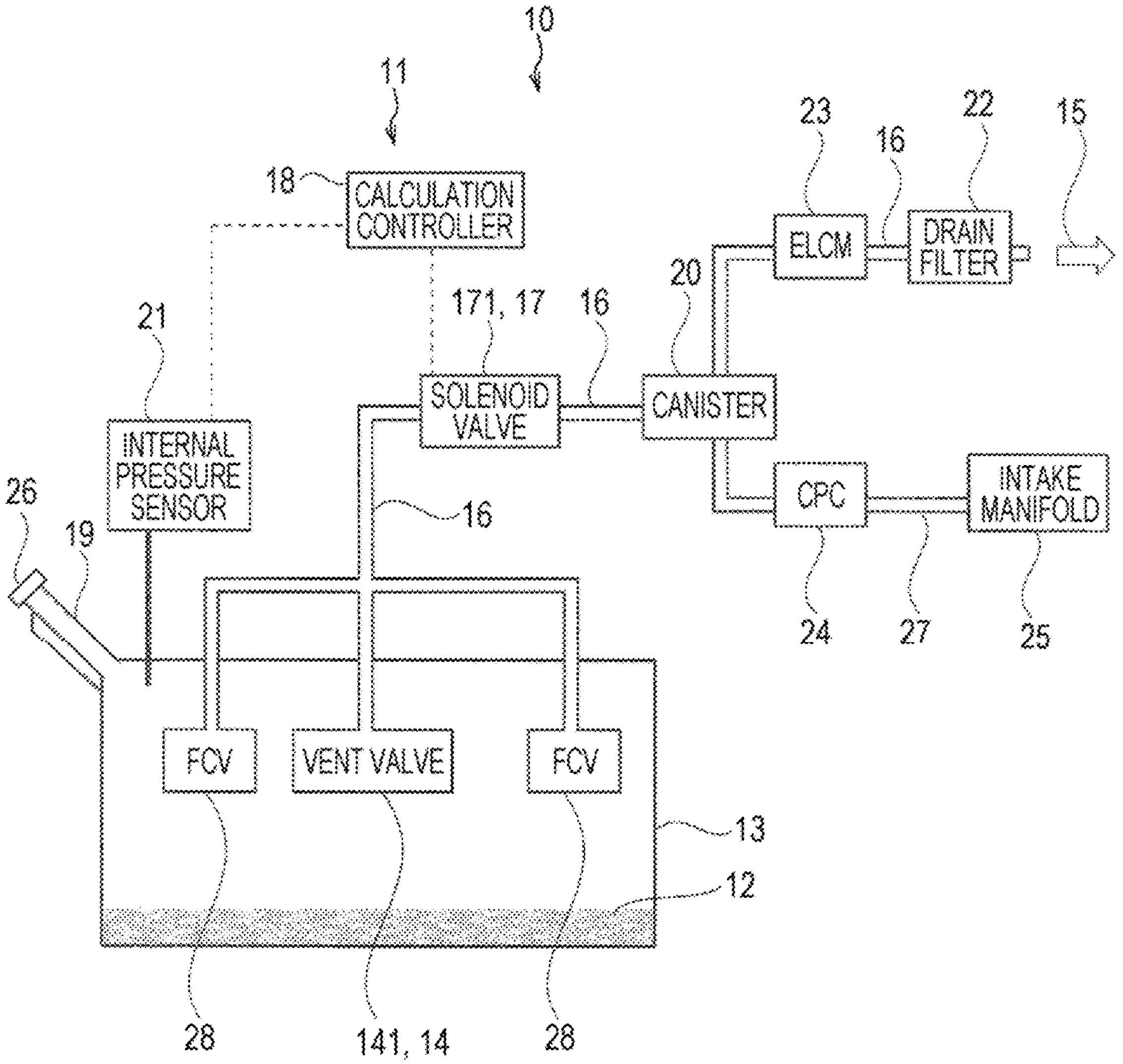
FIG. 1 is a block diagram illustrating a configuration of a vehicle including a fuel tank processing apparatus according to an embodiment of the disclosure.

FIG. 1 is a block diagram illustrating the configuration of a vehicle 10 including the fuel tank processing apparatus 11.

The vehicle 10 is a moving apparatus including an engine. For example, the vehicle 10 may be an engine vehicle, an electric vehicle (EV), a hybrid electric vehicle (HEV), or a plug-in hybrid electric vehicle (PHEV). Alternatively, the vehicle 10 may be an EV including an engine as a range extender.

The fuel tank processing apparatus 11 is an apparatus for guiding gas 15 from a fuel tank 13 to the outside. For example, the fuel tank processing apparatus 11 mainly includes the fuel tank 13, a first valve 14, a discharge path 16, a second valve 17, and a calculation controller 18.

The fuel tank 13 is a device that stores fuel 12 to be supplied to an engine (not illustrated). The fuel 12 may be, for example, gasoline, light oil, or mixed oil.

A fuel filler port 19 is provided at the top of the fuel tank 13. The fuel filler port 19 is a substantially cylindrical device that couples the fuel tank 13 with the outside. The fuel filler port 19 receives a nozzle of a fuel-supplying device when the fuel 12 is supplied to the fuel tank 13. An outer end of the fuel filler port 19 is sealed with a cap 26.

An internal pressure sensor 21 is a device that measures the pressure in the fuel tank 13. An electric signal representing the internal pressure of the fuel tank 13 measured by the internal pressure sensor 21 is transmitted to the calculation controller 18.

The calculation controller 18 includes a CPU, a RAM, a ROM, and a timer and executes a predetermined calculation control process based on, for example, an input signal received from the internal pressure sensor 21. For example, the calculation controller 18 adjusts an opening degree of the second valve 17. For example, the calculation controller 18 adjusts the opening degree of the second valve 17 in a stepless manner based on a change in condition of the fuel tank 13 that occurs when the second valve 17 is opened. The calculation controller 18 includes a storage unit. The storage unit stores a program for executing processes of the fuel tank processing apparatus 11 described below.

The discharge path 16 is a pipe line through which a vent valve 141, which is a first valve 14, communicates with the outside of the fuel tank 13 and through which the gas 15 discharged from the fuel tank 13 flows. The discharge path 16 is, for example, a pipe made of a synthetic resin, a metal, or the like. The gas 15 is gas vaporized from the fuel 12, air in the fuel tank 13, or a mixture of the vaporized gas and air.

Fuel cut valves (FCVs) 28, the vent valve 141, a solenoid valve 171, a canister 20, an evaporative leak check module (ELCM) 23, and a drain filter 22 are disposed in the discharge path 16 in that order from an upstream side of the flow of the gas 15.

The fuel path 27 is a pipe line that branches from the discharge path 16 at a location at which the canister 20 is disposed. The fuel path 27 is, for example, a pipe made of a synthetic resin, a metal, or the like.

The FCVs 28 are valves used to stop the fuel supply selectively, and are also referred to as fuel cut valves.

The vent valve 141 is an example of the first valve 14. The vent valve 141 is disposed in the fuel tank 13 that stores the fuel 12. The vent valve 141 closes when the liquid level of the fuel 12 in the fuel tank 13 reaches or exceeds a predetermined level, and prevents the fuel 12 from flowing out. The structure of the vent valve 141 will be described below with reference to FIG. 2.

The solenoid valve 171 is an example of the second valve 17, and is disposed in the discharge path 16. The solenoid valve 171 is coupled to an output terminal of the calculation controller 18. The opening/closing operation and the opening degree of the solenoid valve 171 are controlled by the calculation controller 18. As described below, when the fuel tank 13 is refilled, the opening degree of the solenoid valve 171 is set to enable quick depressurization of the fuel tank 13 while preventing the vent valve 141 from being locked.

The canister 20 contains an adsorbent composed of, for example, activated carbon. Since the canister 20 contains the adsorbent, vaporized fuel contained in the gas 15 that is discharged from the fuel tank 13 and flows through the discharge path 16 can be adsorbed.

The ELCM 23 is also referred to as an evaporative leak check module. The ELCM 23 is a device that checks whether there is a leak in the fuel tank 13 or the canister 20.

The drain filter 22 is a filter for purifying the gas 15 that passes through the discharge path 16.

A canister purge control (CPC) valve 24 is also referred to as a purge control solenoid valve. An opening degree of the CPC valve 24 is set in accordance with a duty ratio of a control signal output from the calculation controller 18. When the ELCM 23 performs leakage diagnosis, the opening degree of the CPC valve 24 is adjusted in accordance with the diagnostic status. During normal control, the opening degree of the CPC valve 24 is controlled in accordance with the operational conditions.

An intake manifold 25 is a device that distributes air between intake ports of cylinders of an engine (not illustrated).

Figure 2:
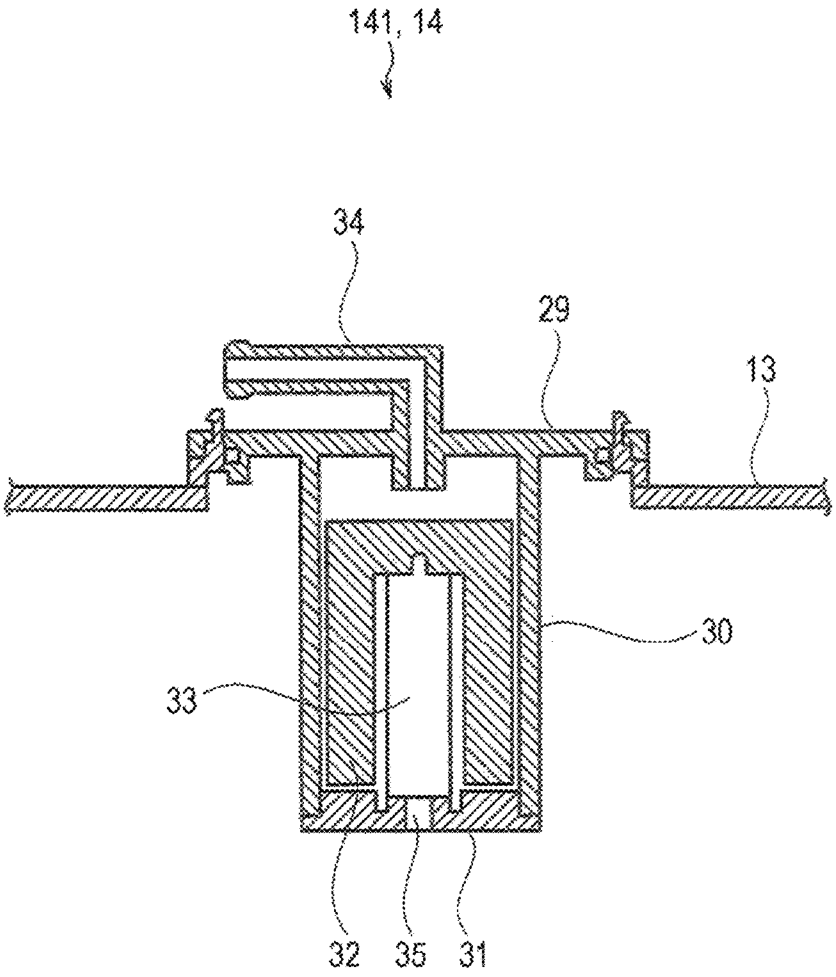
FIG. 2 is a sectional view of a vent valve included in the fuel tank processing apparatus according to the embodiment of the disclosure.

FIG. 2 is a sectional view of the vent valve 141 included in the fuel tank processing apparatus 11.

The vent valve 141 mainly includes a vent flange 29, a main body 30, a lid 31, a float 32, an elastic member 33, and a communication pipe 34. The communication pipe 34 is coupled to the above-described discharge path 16.

The vent flange 29 is disposed to block an opening formed in an upper surface of the fuel tank 13. The main body 30 is provided on a lower surface of the vent flange 29. The lid 31 blocks a lower end of the vent flange 29. The float 32 is disposed in the main body 30 and is vertically movable. The float 32 is made of a material having a relative density less than that of the fuel 12, for example, a foamed synthetic resin. The elastic member 33 is disposed on the upper surface of the lid 31, and is made of an elastic material that urges the float 32 upward. The lid 31 has the communication port 35 through which the inside of the main body 30 communicates with the inside of the fuel tank 13.

When the liquid level of the fuel 12 in the fuel tank 13 rises, the fuel 12 flows into the main body 30 through the communication port 35, and the float 32 moves upward. Accordingly, the upper end of the float 32 blocks the lower end of the communication pipe 34, so that the fuel 12 does not flow out of the main body 30.

As described above, the vent valve 141 includes the float 32 that is vertically movable. Therefore, depending on the pressure drop in the discharge path 16 connected to the communication pipe 34, there is a risk that the float 32 will accidentally block the lower end of the communication pipe 34. To prevent this, in the present embodiment, the opening degree of the solenoid valve 171 disposed in the discharge path 16 is controlled as described below.

Figure 3:
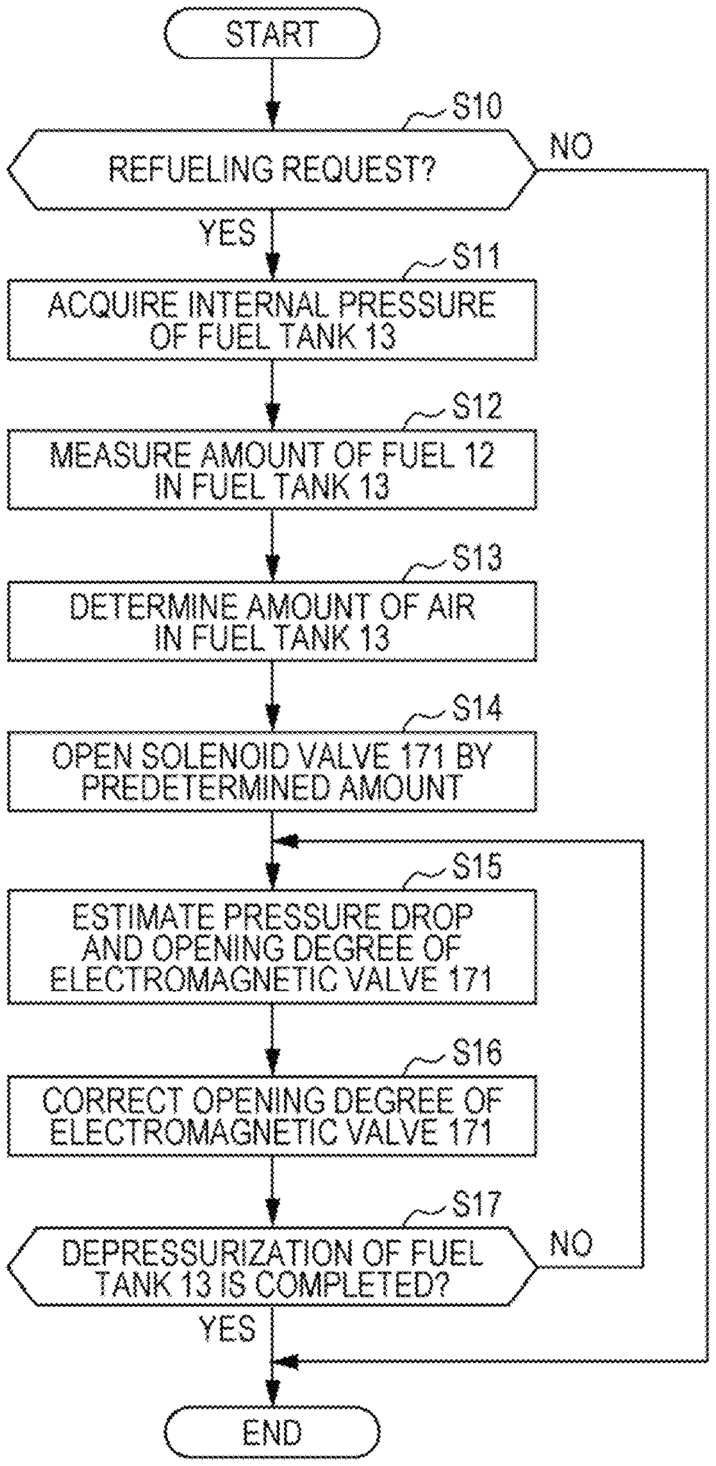
FIG. 3 is a flowchart of a method by which the fuel tank processing apparatus according to the embodiment of the disclosure depressurizes a fuel tank.

FIG. 3 is a flowchart of a method by which the fuel tank processing apparatus 11 depressurizes the fuel tank 13. The method for depressurizing the fuel tank 13 will be described based on the flowchart of FIG. 3 with reference to the above-described drawings.

In step S10, the calculation controller 18 determines whether a refueling request has been issued. The refueling request is issued when, for example, an occupant of the vehicle 10 operates a fuel filler lever, button, or the like (not illustrated) to fill the fuel tank 13 with the fuel 12.

When the result of the determination is YES in step S10, that is, when a refueling request has been issued, the calculation controller 18 proceeds to step S11.

When the result of the determination is NO in step S10, that is, when no refueling request has been issued, the calculation controller 18 proceeds to END.

In step S11, the calculation controller 18 acquires the internal pressure of the fuel tank 13. For example, the calculation controller 18 causes the internal pressure sensor 21 to measure the internal pressure of the fuel tank 13.

In step S12, the calculation controller 18 causes a fuel level sensor (not illustrated) to measure the amount of the fuel 12 in the fuel tank 13.

In step S13, the calculation controller 18 determines the amount of air in the fuel tank 13. The amount of air in the fuel tank 13 is calculated by subtracting the amount of the fuel 12 in the fuel tank 13 from the total capacity of the fuel tank 13.

In step S14, the calculation controller 18 opens the solenoid valve 171 at a predetermined opening degree. For example, the calculation controller 18 sets the opening degree of the solenoid valve 171 to 50%.

Figure 4:
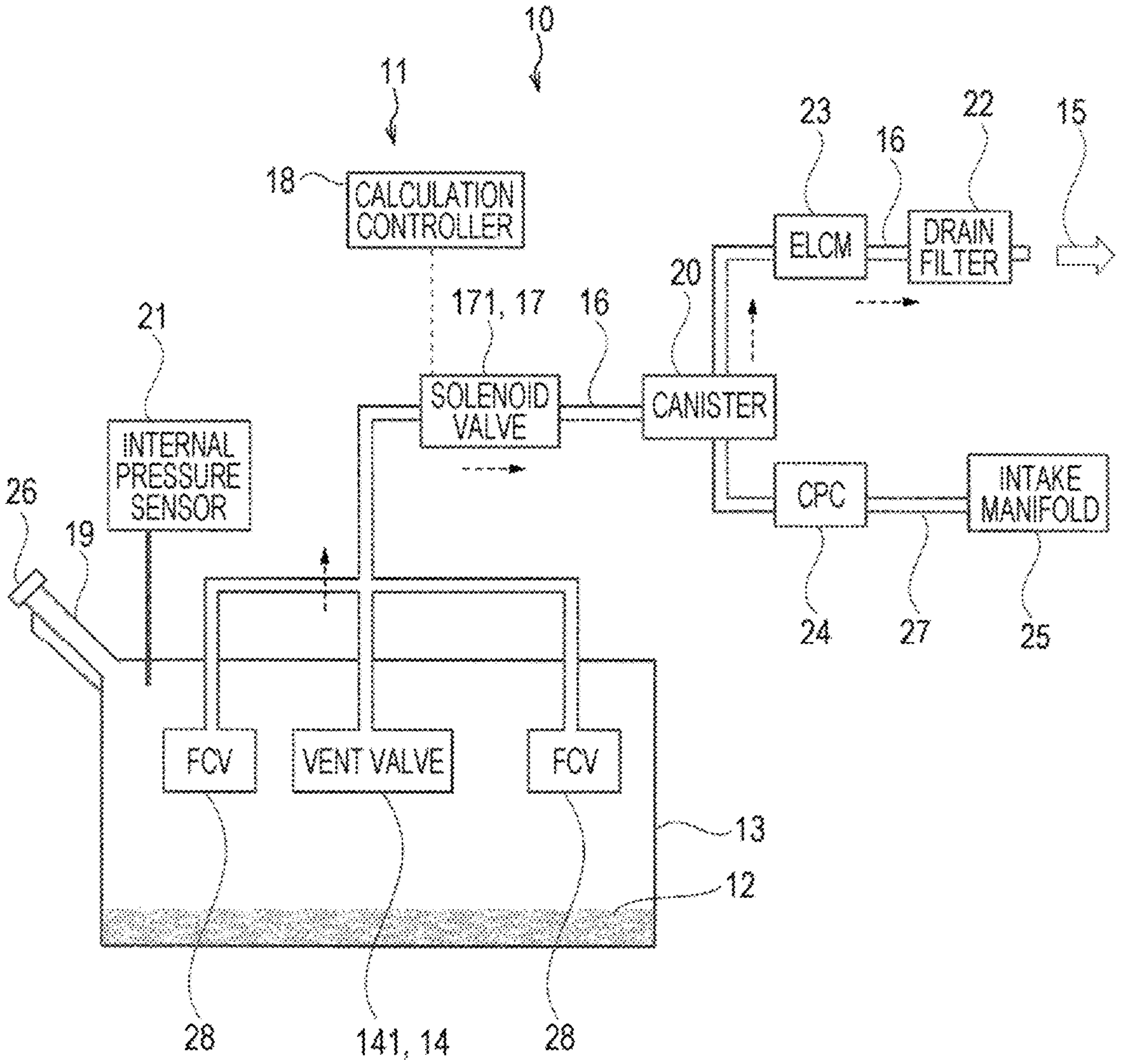
FIG. 4 is a block diagram illustrating a state in which the fuel tank is depressurized in a vehicle including the fuel tank processing apparatus according to the embodiment of the disclosure.

FIG. 4 is a block diagram illustrating the state in which the fuel tank 13 is depressurized in step S14. In FIG. 4, the dotted line arrow indicates the path along which the gas 15 in the fuel tank 13 is discharged. When the solenoid valve 171 is opened, the gas 15 in the fuel tank 13 is discharged to the outside of the fuel tank 13 through the discharge path 16. For example, the gas 15 flows to the outside of, for example, the vehicle through the inside of the fuel tank 13 and through the solenoid valve 171, the canister 20, the ELCM 23, and the drain filter 22 disposed in the discharge path 16.

In step S15, the calculation controller 18 calculates the pressure drop in the discharge path 16 when the solenoid valve 171 is opened at the predetermined opening degree. In addition, in step S15, the calculation controller 18 estimates an appropriate opening degree of the solenoid valve 171.

The operation of the calculation controller 18 in step S15 will be described with reference to FIGS. 5 and 6. First, the pressure drop in the discharge path 16 is estimated from the amount of the fuel 12 in the fuel tank 13, the time spent for the depressurization, and a change in the internal pressure of the fuel tank 13 by using correspondence tables illustrated in FIG. 5. Next, the appropriate opening degree of the solenoid valve 171 is estimated from the amount of the fuel 12 in the fuel tank 13, the pressure drop in the discharge path 16, and a change in the internal pressure of the fuel tank 13 by using correspondence tables illustrated in FIG. 6. These correspondence tables are stored in advance in a storage unit, for example, a semiconductor storage device, disposed inside or outside the calculation controller 18.

The tables illustrated in FIG. 5 are correspondence tables used to estimate the pressure drop when the fuel tank 13 is depressurized by using the fuel tank processing apparatus 11. The correspondence tables are also referred to as look-up tables to which output values are allocated to input information in advance. In the correspondence tables illustrated in FIG. 5, the input values are the time spent for the depressurization and a change in the internal pressure of the fuel tank 13. The time spent for the depressurization is, for example, the time spent to change the internal pressure of the fuel tank 13 from 2.0 kPa to 0 kPa. The change in the internal pressure of the fuel tank 13 is the degree of reduction in the internal pressure of the fuel tank 13.

Here, the output value is the pressure drop in the discharge path 16, and is also referred to as a drain pressure drop. In the present embodiment, multiple correspondence tables are prepared in accordance with the amount of the fuel 12 in the fuel tank 13. For example, the correspondence tables are prepared for the amounts of fuel 12 in the range of 1 liter to 70 liter in steps of one liter.

The correlation between the time spent for the depressurization, a change in the internal pressure of the fuel tank 13, the amount of the fuel 12 in the fuel tank 13, and the pressure drop in the discharge path 16 is very complex. In addition, the correlation depends on, for example, the degree to which the drain filter 22 is clogged, the state of adsorption in the canister 20, and the deformation of the pipes that constitute the discharge path 16, and cannot be uniquely determined. In light of the above-described complex correlation, according to the present embodiment, the correspondence tables are prepared in advance to enable simple and quick estimation of the pressure drop in the discharge path 16. This also applies to the correspondence tables illustrated in FIG. 6.

For example, when the amount of the fuel 12 in the fuel tank 13 is 1 liter, the time spent for the depressurization is 3 seconds, and the internal pressure of the fuel tank 13 has changed from 6.0 kPa to 4.0 kPa, the pressure drop in the discharge path 16 is estimated to be 2.5 kPa.

FIG. 6 illustrates correspondence tables used to estimate the opening degree of the solenoid valve 171 when the fuel tank 13 is depressurized using the fuel tank processing apparatus 11. In the correspondence tables illustrated in FIG. 6, the input values are the pressure drop in the discharge path 16 and a change in the internal pressure of the fuel tank 13. The output value is an appropriate opening degree of the solenoid valve 171. Here, multiple correspondence tables are prepared in accordance with the amount of the fuel 12 in the fuel tank 13. For example, the correspondence tables are prepared for the amounts of fuel 12 in the range of 1 liter to 70 liter in steps of one liter.

For example, when the amount of the fuel 12 in the fuel tank 13 is 1 liter, the pressure drop in the discharge path 16 is 1.0 kPa, and the internal pressure of the fuel tank 13 has changed from 6.0 kPa to 4.0 kPa, the appropriate opening degree of the solenoid valve 171 is estimated to be 5.0%.

In step S16, the calculation controller 18 corrects the opening degree of the solenoid valve 171. For example, the calculation controller 18 corrects the opening degree of the solenoid valve 171 to the opening degree estimated in step S15. Thus, the opening degree of the second valve 17 can be appropriately adjusted, and the pressure drop in the discharge path 16 can be set to a predetermined value, so that the vent valve 141 is not easily locked. In addition, the internal pressure of the fuel tank 13 can be, for example, reduced to atmospheric pressure.

In step S17, the calculation controller 18 determines whether the depressurization of the fuel tank 13 is completed. For example, the calculation controller 18 determines whether the internal pressure of the fuel tank 13 measured by the internal pressure sensor 21 is reduced to a pressure equivalent to atmospheric pressure.

When the result of the determination is YES in step S17, that is, when the depressurization of the fuel tank 13 is completed, the calculation controller 18 completes the depressurization of the fuel tank 13 by the fuel tank processing apparatus 11. Accordingly, an occupant or an operator can open the cap 26. Since the internal pressure of the fuel tank 13 is sufficiently reduced by the operation of steps up to step S17, the fuel 12 and the gas 15 are not ejected to the outside from the cap 26. After that, a nozzle of a fuel-supplying device is inserted into the fuel filler port 19, and the fuel 12 is supplied to the fuel tank 13.

When the result of the determination is NO in step S17, that is, when the depressurization of the fuel tank 13 is not completed, the calculation controller 18 returns to step S15 and continues the depressurization of the fuel tank 13.

The above describes the depressurization of the fuel tank 13 using the fuel tank processing apparatus 11.

The technical idea that can be grasped from the above-described embodiment will be described below together with the effects thereof.

A fuel tank processing apparatus according to an embodiment of the disclosure includes a first valve, a discharge path, a second valve, and a calculation controller. The first valve is disposed in a fuel tank that stores fuel. The first valve communicates with outside through the discharge path. Gas discharged from the fuel tank flows through the discharge path. The second valve is disposed in the discharge path. The calculation controller is configured to adjust an opening degree of the second valve. The calculation controller is configured to adjust the opening degree of the second valve based on a change in condition of the fuel tank when the second valve is opened. According to the fuel tank processing apparatus of the embodiment of the disclosure, the opening degree of the second valve is appropriately adjusted so that the pressure drop in the discharge path can be set to a predetermined value and that the first valve is not easily locked.

In the fuel tank processing apparatus according to the embodiment of the disclosure, the first valve is a vent valve. According to the fuel tank processing apparatus of the embodiment of the disclosure, the vent valve is not easily locked when the gas in the fuel tank is discharged to the outside through the discharge path.

In the fuel tank processing apparatus according to the embodiment of the disclosure, the calculation controller is configured to adjust the opening degree of the second valve based on an amount of the fuel in the fuel tank and a degree of reduction in an internal pressure of the fuel tank when the second valve is opened. According to the fuel tank processing apparatus of the embodiment of the disclosure, the opening degree of the second valve can be appropriately adjusted in accordance with the conditions of the fuel tank and the discharge path.

In the fuel tank processing apparatus according to the embodiment of the disclosure, the calculation controller is configured to, in response to an operation for supplying the fuel, acquire information representing an internal pressure of the fuel tank and an amount of the fuel in the fuel tank. The calculation controller is configured to calculate a degree of reduction in the internal pressure of the fuel tank while the opening degree of the second valve is set to a predetermined degree. The calculation controller is configured to adjust the opening degree of the second valve based on the internal pressure of the fuel tank, the amount of the fuel in the fuel tank, and the degree of reduction in the internal pressure of the fuel tank. According to the fuel tank processing apparatus of the embodiment of the disclosure, the second valve is opened, and then the opening degree of the second valve is adjusted in accordance with, for example, the degree of reduction in the internal pressure of the fuel tank. Accordingly, even when, for example, the amount of fuel in the fuel tank and conditions of the discharge path are changed, the pressure drop in the discharge path can be set to a predetermined value, and the first valve is not easily locked.

In the fuel tank processing apparatus according to the embodiment of the disclosure, the second valve is a solenoid valve. According to the fuel tank processing apparatus of the embodiment of the disclosure, the second valve is the solenoid valve. Since the opening degree of the solenoid valve is adjustable in a stepless manner, the pressure drop in the discharge path can be finely controlled.

While embodiments of the disclosure are described above, the disclosure is not limited to the embodiments, and changes are possible without departing from the gist of the disclosure. In addition, the above-described embodiments may be applied in combination with each other.

The calculation controller 18 illustrated in FIGS. 1 and 4 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the calculation controller 18. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIGS. 1 and 4.

The invention claimed is:

1. A fuel tank processing apparatus comprising:
- a first valve disposed in a fuel tank that stores fuel;
- a discharge path through which the first valve communicates with outside of the fuel tank and through which gas discharged from the fuel tank flows;
- a second valve disposed in the discharge path; and
- a calculation controller configured to adjust an opening degree of the second valve, wherein the calculation controller is configured to adjust the opening degree of the second valve based on a change in an internal pressure of the fuel tank when the second valve is opened, and
- wherein the calculation controller is configured to calculate a pressure drop in the discharge path based on an amount of the fuel in the fuel tank, a time spent for depressurizing the fuel tank, and a degree of reduction in an internal pressure of the fuel tank.

2. The fuel tank processing apparatus according to claim 1, wherein the first valve is a vent valve.

3. The fuel tank processing apparatus according to claim 1, wherein the calculation controller is configured to adjust the opening degree of the second valve based on an amount of the fuel in the fuel tank and a degree of reduction in an internal pressure of the fuel tank when the second valve is opened.

4. The fuel tank processing apparatus according to claim 1,
- wherein the calculation controller is configured to, in response to an operation for supplying the fuel,
  - acquire information representing an internal pressure of the fuel tank and an amount of the fuel in the fuel tank,
  - calculate a degree of reduction in the internal pressure of the fuel tank while the opening degree of the second valve is set to a predetermined degree, and
  - adjust the opening degree of the second valve based on the internal pressure of the fuel tank, the amount of the fuel in the fuel tank, and the degree of reduction in the internal pressure of the fuel tank.

5. The fuel tank processing apparatus according to claim 1, wherein the second valve is a solenoid valve.

6. A fuel tank processing apparatus comprising:
- a first valve disposed in a fuel tank that stores fuel;

a discharge path through which the first valve communicates with outside and through which gas discharged from the fuel tank flows;

a second valve disposed in the discharge path; and circuitry configured to adjust an opening degree of the second valve, wherein the circuitry is configured to adjust the opening degree of the second valve based on a change in an internal pressure of the fuel tank when the second valve is opened.

7. The fuel tank processing apparatus according to claim 1, wherein the calculation controller is configured to adjust the opening degree of the second valve from a first opening degree to a second opening degree in response to the change in the internal pressure of the tank.

8. The fuel tank processing apparatus according to claim 1, further comprising an internal pressure sensor configured to measure an internal pressure of the fuel tank and to transmit a signal representing the internal pressure to the calculation controller.

9. The fuel tank processing apparatus according to claim 1, further comprising a fuel level sensor configured to measure an amount of the fuel in the fuel tank, wherein the calculation controller acquires the amount of the fuel from the fuel level sensor.

10. The fuel tank processing apparatus according to claim 9, wherein the calculation controller is configured to determine an amount of air in the fuel tank by subtracting the amount of the fuel measured by the fuel level sensor from a total capacity of the fuel tank.

11. The fuel tank processing apparatus according to claim 1, wherein the calculation controller is configured to, in response to a refueling request, open the second valve at a predetermined opening degree prior to adjusting the opening degree of the second valve based on the change in the internal pressure of the fuel tank.

12. The fuel tank processing apparatus according to claim 11, wherein the predetermined opening degree is 50%.

13. The fuel tank processing apparatus according to claim 1, wherein the calculation controller estimates the pressure drop using a prestored correspondence table that maps the amount of the fuel in the fuel tank, the time spent for depressurization, and the degree of reduction in the internal pressure of the fuel tank to the pressure drop in the discharge path.

14. The fuel tank processing apparatus according to claim 13, wherein the calculation controller estimates an appropriate opening degree of the second valve using a prestored correspondence table that maps the amount of the fuel in the fuel tank, the pressure drop in the discharge path, and the degree of reduction in the internal pressure of the fuel tank to the opening degree of the second valve.

15. The fuel tank processing apparatus according to claim 14, wherein the calculation controller includes a storage unit that stores the prestored correspondence tables.

16. The fuel tank processing apparatus according to claim 14, wherein the calculation controller is configured to correct the opening degree of the second valve to the estimated appropriate opening degree.

17. The fuel tank processing apparatus according to claim 1, wherein the calculation controller is configured to determine whether depressurization of the fuel tank is complete by determining whether the internal pressure of the fuel tank has been reduced to atmospheric pressure, and to continue adjusting the opening degree of the second valve until the depressurization is determined to be complete.

18. The fuel tank processing apparatus according to claim 1, wherein the discharge path includes a canister disposed therein, the canister containing an adsorbent configured to adsorb vaporized fuel from gas discharged from the fuel tank.

19. The fuel tank processing apparatus according to claim 1, wherein the first valve includes a float that is vertically movable within a main body, the float being configured to block a communication pipe connected to the discharge path when a liquid level of the fuel in the fuel tank reaches or exceeds a predetermined level.

* * * * *